Nov. 4, 1969 E. D. HILL 3,475,803

ROLLER FOR APPLYING PAINT, INK AND THE LIKE

Filed Aug. 27, 1965

INVENTOR
EDWARD D. HILL
BY
Oberlin, Maky & Donnelly
ATTORNEYS

United States Patent Office 3,475,803

Patented Nov. 4, 1969

3,475,803

ROLLER FOR APPLYING PAINT, INK AND THE LIKE

Edward D. Hill, 11212 Edgewater Drive, Cleveland, Ohio 44102

Filed Aug. 27, 1965, Ser. No. 483,263
Int. Cl. B21b *31/08;* B41f *31/14*
U.S. Cl. 29—132 13 Claims

ABSTRACT OF THE DISCLOSURE

A roller for applying paint, ink and the like having a substantially central shaft, a surrounding layer of a cellular material and an outer surface of a polyurethane which is the reaction product of a polyethylene glycol, a polyol cross-linking agent and an isocyanate. The cellular material may be a flexible polyurethane foam, cellular gelatin or similar materials. The polyurethane which forms the outer surface of the roller preferably has a hardness of at least approximately 45 durometers.

This invention relates generally as indicated to a roller for applying paint, ink and the like, and more particularly to such a roller having an outer surface of polyurethane and to a process for producing same.

One of the most commonly used rollers in the printing industry is that made from a composition of animal glue or animal glue modified by glycerine or a similar acting agent. Rollers of this type have been extremely well accepted in the industry and are generally quite suitable for use in various printing processes. They do, however, have certain disadvantages in that they are vulnerable to atmospheric conditions and to the action of ingredients contained in certain of the commercially used inks. For example, they are quite hygroscopic and thus tend to absorb moisture and swell when the humidity is high, and as a result require close humidity control which complicates and hinders their general utility. Also, in warm weather, the glue compositions become very warm and flexible, whereas conversely, in cold weather, they tend to become very hard.

The gelatin or animal glue rollers of the type discussed above also have the further disadvantage of being somewhat susceptible to abrasion. This is a serious disadvantage in certain applications as for example, in graining rolls which are continuously scraped by a sharp doctor blade. It is therefore quite important that rollers of this type have as much abrasion resistance as possible.

Another type of inking roller which is commonly used has a surface formed of a polyester-based polyurethane, such as that formed by reacting, for example, a branched adipate polyester with a diisocyanate. Such rollers are particularly suitable for use with hydrocarbon-based inks of low kauributanol number, but have the disadvantage of being readily penetrable by vegetable oil inks which are commonly used in lithographic processes. By being susceptible to ink penetration, the roller surface will absorb ink, and a film of ink will thus be provided on its surface which creates a residual color-carryover problem, since any future printing will be done on a film of ink rather than on the roller surface.

Rollers of this type have also been found to be quite susceptible to the action of certain solvents such as the toluol solvents, which are used in graining inks, and will result in excsesive swelling of the roller when in contact with such solvents. Also, such polyurethanes, especially those of low durometer, have a tendency to revert to the liquid state, unless an inhibiting agent is incorporated therein, which is undesirable since it increases the cost of and complicates the manufacture thereof.

It is an object of this invention therefore to provide a roller suitable for the application of paint, ink or the like which is chemically and dimensionally stable and capable of retaining concentricity during use without being susceptible to the adverse affects of heat, humidity, abrasion or solvents.

Another object of this invention is the provision of such a roller having an outer surface of polyurethane which is capable of withstanding the action of toluol solvents.

Yet another object is the provision of a roller which may be used without restriction as to humidity, temperature, etc. and which does not require control of such.

It is an additional object of this invention to provide a process for making such a roller.

Other objects, features and advantages of this invention will become apparent to those skilled in the art after a reading and understanding of the following more detailed description.

To the accomplishment of the foregoing and related ends, the invention, then, comprises the features hereinafter fully described and particularly pointed out in the claims, the following description and the annexed drawing setting forth in detail certain illustrative embodiments of the invention, these being indicative, however, of but a few of the various ways in which the principle of the invention may be employed.

Figure 1:
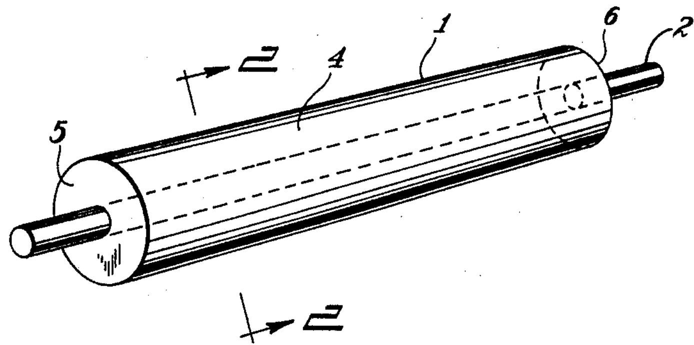
FIG. 1 is a perspective view of a roller of this invention.
Figure 2:
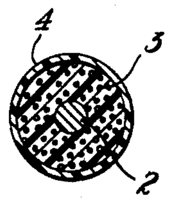
FIG. 2 is a transverse section on line 2—2 of FIG. 1.

Referring now more particularly to the drawing, it will be seen that the above and other objects are achieved by means of this invention in which a roller, designated generally by the numeral 1, is provided comprising a substantially central metal shaft 2 and a surrounding layer of resilient cellular material 3. An outer surface of polyurethane 4 overlies and surrounds the cellular material, which polyurethane consists essentially of the reaction product of polyethylene glycol, a polyol cross-linking agent, and an isocyanate. As shown in FIG. 1, the roller has its ends 5 and 6 coated with the same polyurethane as that of the outer ink or paint applying surface. The invention also includes the process for making such rollers, as will be more completely described hereinafter.

The thickness of the outer surface of the roller may vary according to the particular conditions to be encountered in use, and, to some extent, by the size of the roller. A surface thickness of about ¼" to 2" will be used for most applications.

As mentioned, the outer surface of the roller is a polyurethane which is formed by reaction of a polyethylene glycol, a polyol, and an isocyanate compound. The polyethylene glycol suitable for use in this invention may in general be any of those commercially available, with the selection of a particular such material being dependent upon the intended use of the roller. In general, such compounds are formed by reacting ethylene oxide with water, ethylene glycol, or diethylene glycol, and have the general structure configuration:

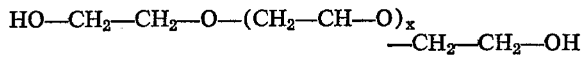

$$HO—CH_2—CH_2—O—(CH_2—CH—O)_x—CH_2—CH_2—OH$$

The preferred materials for use with this invention are those having a hydroxyl number of approximately 55, such as that sold by Witco Chemical Company under the trade designation "Formrez F13–99" or "FT–67." Another similar material which is also suitable is that sold by the Union Carbide and Chemicals Corporation under the trade name "Carbowax."

Numerous isocyanate compounds are commercially available and are suitable for use in this invention, with one preferred resin being that sold by the Mobay Chemical Company under the trade name "Mondur TD–80," this diisocyanate being an 80% to 20% mixed isomer of 2,4 and 2,6 tolylene diisocyanate. Other commercially available isocyanates are also suitable, such as the tolylene diisocyanates manufactured by E. I. du Pont de Nemours and Company under the trade designation "Hylene T" and "Hylene TM," and that sold under the trade designation "Nacconate" by the National Aniline Division of Allied Chemical and Dye Corp. Other suitable isocyanate compounds include any of the mono or polyisocyanates commercial available, with specific illustrative examples including 3,3'-bitolylene-4,4'-diisocyanate, diphenylmethane-4,4'-diisocyanate, 3,3'-dimethyldiphenylmethane - 4,4'-diisocyanate, meta-phenylene diisocyanate, 2,4 tolylene diisocyanate dimer, triphenylmethane triisocyanate, hexamethylene diisocyanate, dianisidine diisocyanate, and polyaryl triisocyanate.

Numerous polyols are also suitable for use in producing the polyurethane of this invention. Illustrative examples include trimethylolpropane, 1,4 butanediol, 1,2,6 hexanetriol, sorbitol, and Quadrol which is an aminoalcohol, N,N,N'N' - tetrakis(2-hydroxyl - propyl)ethylene diamine. The preferred such material is trimethylolpropane.

The quantities of the respective ingredients may be varied to a considerable extent, depending upon the particular use of the roller. In general the polyol should comprise from approximately 1 to 25 weight percent, based on the total weight of the mixture, and the isocyanate compound should comprise generally from about 1 to 60 weight percent, based on the total weight of the mixture. The polyethylene glycol, of course, constitutes the remainder of the mixture. The preferred ranges for the polyol and isocyanate are about 1.5 to 7.5 weight percent and approximately 10 to 30 weight percent respectively.

Specific illustrative formulations of the polyurethane of this invention include the following:

Formulation A 100 parts of polyethylene glycol, 7½ parts of trimethylolpropane, and 24 parts of diisocyanate, which composition has a Shore A hardness of approximately 70 durometers.

Composition B 100 parts of polyethylene glycol, 7½ parts of trimethylolpropane, and 12.7 parts of diisocyanate, which composition has a hardness in the range of about 45 to 50 durometers.

Formulation C 100 parts of polyethylene glycol, 3 parts of trimethylolpropane, and 14.8 parts of diisocyanate, which gives a hardness of about 55 durometers.

Formulation D 100 parts of polyethylene glycol, 6 parts of trimethylolpropane, and 20.9 parts of diisocyanate, which has a hardness of about 67 durometers.

If desired, a catalyst may be used to accelerate reaction of the above-described ingredients to produce the desired polyurethane, although the use of a catalyst is not essential. Illustrative examples of such catalysts include triethylamine, triethylenediamine, dimethyl ethanolamine, N-methyl morpholine, N,N'-diethylcyclohexylamine, N,N' dimethylpiperazine, bismuth nitrate, lead benzoate, lead oleate, sodium propionate, and lithium acetate.

To be suitable for use as a printing roller, and particularly in the lithographic field, the surface material of the roller should have a Shore A hardness in the general range of about 10 to 50 durometers with the preferred range being from about 25 to 30 durometers. In the present invention, however, the polyethylene glycol-based polyurethane has a hardness of at least approximately 45 durometers, and hence would be normally too hard for general use in printing. As a result, it is necessary to provide the roller with a resilient cellular center immediately surrounding the metal shaft. Through this unique combination, it is possible to provide the desired roller having the advantages and properties previously referred to.

Numerous materials are suitable for use as the resilient cellular material of this invention, including flexible polyurethane foams such as that described in U.S. Patent 2,764,565. Reference may be made to this patent for a detailed explanation of such composition, but in general, the foam is a polyester-based polyurethane formed by reaction of an adipic acid-diethylene glycol polyester, tolylene diisocyanate, and an activator mixture containing an adipic acid ester, sulfonated castor oil, ammonium oleate, water, and a paraffin oil. Further reference for a description of suitable polyurethane foams may be found in the book entitled "Polyurethanes" by Bernard A. Dombrow, Rhinehold Publishing Corporation, New York, 1958 edition, in the chapter on flexible foams.

Another suitable center material is cellular gelatin such as that described in my previously issued Patent 2,598,167. In general, such material is prepared by agitation of a gelatinous material in liquid form in the presence of air or other gaseous material to create the cellular condition.

To prepare the roller of this invention, the polyethylene glycol and polyol are mixed in any suitable mixing vessel and are dehydrated to remove any water which may be present to avoid foaming when admixed with the isocyanate. Since the polyethylene glycol is a solid at room temperature, it must be heated to about 140° F. to 180° F. so that it will be in a liquid condition when admixed with the other ingredients. The isocyanate is then admixed with the glycol and polyol. It is not necessary to utilize an additional solvent, as the diisocyanate and polyol are normally liquid solutions. If desired, however, a suitable solvent may, of course, be employed.

After preparation of the polyurethane composition, a suitable metal shaft is positioned within a roller mold. The shaft is preferably thoroughly cleaned so as to be free from grease, or alternatively, a suitable bonding agent, such as acrylic resin dissolved in methylisobutyl ketone, may be applied thereto to insure that the shaft will firmly adhere to the adjacent surface. If desired, the mold may be given a light coating of a parting compound, such as carnauba wax, a silicone grease, oil, etc. to facilitate removal of the roller from the mold after formation.

After properly centering the shaft or core within the mold, the mold is preferably preheated to approximately 230 to 240° F., and the polyurethane composition is then poured or cast thereinto. The mold is then rotated to force the polyurethane composition outwardly against the wall of the mold, and due to the combination of heat and pressure, the polyurethane will form a solid layer or film against the wall of the mold. After formation of such film or layer, the foam composition will be introduced into the mold. The mold is then heated to approximately 160–200° F. and permitted to remain at this temperature for approximately 2 hours for the foam ingredients to react. At the end of this time, the roller is removed from the mold, trimmed to remove any flash material which may have developed during molding, and the ends of the roller are thereafter coated with the aforedescribed polyurethane. The rollers are next finally cured, either in an oven at about 160–200° F. for approximately 2 hours, or alternatively, simply by air drying.

The invention will be better understood by reference to the following specific but non-limiting example.

Example 100 parts by weight of polyethylene glycol having a hydroxyl number of 55, purchased from the Witco Chemical Company under the trade designation "Formrez F13–99" was heated to approximately 140° F. so that it was in a liquid form and was placed into a mixing vessel. 7.5 parts by weight of trimethylolpropane (purchased from the Mobay Chemical Company under the trade designation K–624) was then added, and the contents of the vessel were dehydrated to remove any moisture present. 12.7 parts of Mondur TD–80 tolylene diisocyanate of the Mobay Chemical Company was then added to the vessel. The contents of the vessel were thoroughly admixed for approximately 10 minutes under vacuum.

A metal shaft was cleaned to assure that its surface was free from grease, and a roller mold was also cleaned and a silicone grease parting compound applied to the surface thereof. The shaft was positioned within the mold and centered therein. The mold was preheated to a temperature of 240° F., and the polyurethane composition described above was cast thereinto. The mold was then rotated at a speed of approximately 1100 r.p.m. for about 8 minutes to force the polyurethane composition outwardly against the wall of the mold and to form as a solid layer against the wall thereof.

A flexible foam polyurethane composition comprising approximately 100 parts by weight of caster oil, 30 parts by weight of oMndur TD–80 tolylene diisocyanate, and a small quantity of a polyol cross-linking agent, was prepared by thoroughly mixing in a Lightening propeller-type mixing vessel at room temperature for approximately 12 minutes. This composition was cast into the mold, and the mold was closed and placed into a baking oven. The temperature of the oven was set at about 200° F. and held at this temperature for a period of about 2 hours to cause the ingredients of the composition to foam. The mold was removed from the oven, and the roller was then removed from the mold after which it was trimmed, and the ends thereof were coated with the above-described non-cellular polyurethane. The roller was next placed in an oven at a temperature of approximately 200° F. and permitted to remain there for two hours to cure. The polyurethane outer surface of this roller was found to have a Shore A hardness of approximately 45 durometers.

Rollers of this type have been extensively tested in various printing processes as well as in the application of paint, drawing compounds, etc. to sheet metal surfaces and have been found to have exceptional chemical and dimensional stability with long useful working life. Such rollers have also been found to retain their concentricity and are not susceptible to deterioration through contact with toluol solvents. The extremely tough outer surface of polyurethane also gives the rollers good resistance to abrasion.

What is claimed is:

I therefore particularly point out and distinctly claim as my invention:

1. A roller for applying paint, ink and the like comprising a substantially central shaft, a layer of resilient cellular material surrounding said shaft, and an outer surface of polyurethane overlying and surrounding said cellular material consisting essentially of the cross-linked reaction product of a polyethylene glycol, approximately 1 to about 25 weight percent, based on the weight of the total composition, of a polyol cross-linking agent, and approximately 1 to about 60 weight percent, based on the total weight of the composition, of an isocyanate.

2. The roller of claim 1 in which said polyol is trimethylolpropane.

3. The roller of claim 1 in which the isocyanate is tolylene diisocyanate.

4. The roller of claim 3 in which said tolylene diisocyanate is an 80% to 20% mixed isomer of 2,4 and 2,6 tolylene diisocyanate.

5. The roller of claim 1 in which approximately 1.5 to 7.5 weight percent of said polyol was used.

6. The roller of claim 1 in which approximately 10 to 30 weight percent of said isocyanate was used.

7. The roller of claim 1 in which said cellular material is a flexible polyurethane foam.

8. The roller of claim 1 in which the ends thereof are covered with said polyurethane.

9. The roller of claim 1 in which the polyurethane surface has a Shore A hardness of at least about 45 durometers.

10. A roller for applying paint, ink and the like comprising a substantially central shaft, a layer of resilient cellular material surrounding said shaft, and an outer surface of polyurethane overlying and surrounding said cellular material consisting essentially of the cross-linked reaction product of a polyethylene glycol, approximately 1 to 25 weight percent, based on the total weight of the composition, of trimethylolpropane, and approximately 1 to 60 weight percent, based on the total composition, of tolylene diisocyanate.

11. The roller of claim 10 in which approximately 1.5 to about 7.5 weight percent of said trimethylol propane was used, and approximately 10 to about 30 weight percent of said tolylene diisocyanate was used.

12. The roller of claim 11 in which the polyurethane surface has a Shore A hardness of at least about 45 durometers.

13. The roller of claim 12 in which said resilient cellular material is a flexible polyurethane foam.

References Cited

UNITED STATES PATENTS

| | | | |
|---|---|---|---|
| 1,555,389 | 9/1925 | Stevens | 101—348 |
| 2,112,095 | 3/1938 | Hoffman | 29—132 |
| 2,333,800 | 11/1943 | Lewis et al. | 29—132 |
| 3,133,340 | 5/1964 | Finelli | 29—132 |

FOREIGN PATENTS

| | | |
|---|---|---|
| 733,624 | 7/1955 | Great Britain. |
| 749,541 | 5/1956 | Great Britain. |
| 803,160 | 10/1958 | Great Britain. |

OTHER REFERENCES

Winding, C. C., and Hiatt, G. D.: Polymeric Materials, McGraw Hill Book Co., New York, 1961, pp. 269–274.

ROBERT W. PULFREY, Primary Examiner

FREDERICK FREI, Assistant Examiner

U.S. Cl. X.R.

101—348; 260—2.5